United States Patent [19]

Kim

[11] Patent Number: 5,528,567
[45] Date of Patent: Jun. 18, 1996

[54] DISK CHANGER FOR OPTICAL DISKS HAVING DIFFERENT SIZES

[75] Inventor: Sang-tae Kim, Suwon, Rep. of Korea

[73] Assignee: Samsung Electronics Co., Ltd., Kungki-do, Rep. of Korea

[21] Appl. No.: 373,961

[22] Filed: Jan. 17, 1995

[30] Foreign Application Priority Data

Mar. 17, 1994 [KR] Rep. of Korea .................. 94-5365

[51] Int. Cl.[6] .................. G11B 17/22; G11B 33/02; G11B 17/08; G11B 17/02
[52] U.S. Cl. .................. 369/37; 369/36; 369/75.2; 360/98.04; 360/99.06
[58] Field of Search .................. 369/37, 75.2, 36, 369/38; 360/48.04, 99.06

[56] References Cited

U.S. PATENT DOCUMENTS

| | | | |
|---|---|---|---|
| 4,839,881 | 6/1989 | Takahara et al. | 369/75.2 |
| 5,210,728 | 5/1993 | Noguchi et al. | 369/38 |
| 5,293,362 | 3/1994 | Sakurai et al. | 369/75.2 |
| 5,301,177 | 4/1994 | Kumakura | 369/75.2 |
| 5,341,352 | 8/1994 | Isobe | 369/37 |

FOREIGN PATENT DOCUMENTS 5-242579  1/1994  Japan .

Primary Examiner—Stuart S. Levy
Assistant Examiner—Adriana Giordana
Attorney, Agent, or Firm—Sughrue, Mion, Zinn, Macpeak & Seas

[57] ABSTRACT

A disk changer in which a disk, once completely reproduced, can be exchanged for another disk when a selected disk is being reproduced includes an ascending/descending mechanism for raising and lowering a tray member which supports a roulette receiving a plurality of disks, so as to change the disk by lowering and opening the tray member when one disk is being reproduced.

6 Claims, 13 Drawing Sheets

DISK CHANGER FOR OPTICAL DISKS HAVING DIFFERENT SIZES

BACKGROUND OF THE INVENTION

1. Field of the Invention

The present invention relates to a disk changer having a roulette which receives a plurality of disks of the same size and can be rotated and, more particularly, to a disk changer improved to exchange disks received on the roulette when a disk is recorded and/or reproduced.

2. Description of the Related Art

Generally, there are various kinds of disk changers: one which extracts a disk selected from a magazine for receiving a plurality of disks on the same axis, and then records/reproduces the disk; and another which records/reproduces the disk selected from a roulette for receiving a plurality of disks on the same plane by the rotation of the roulette. In the latter case, when changing from one disk to another during reproducing (or recording) a disk selected from the disks on the roulette, the reproducing procedure has to be interrupted. Thereafter, the roulette is revolved to the selected disk, and then the reproducing is performed.

Also, there is another disk changer for receiving two kinds of disks having different sizes (e.g., a laser disk and a compact disk), which also selects a disk and then reproduces the selected disk. The disk changer has a tray for receiving the larger disk and a roulette for receiving a plurality of smaller disks. However, it is impossible to draw out the disk while it is being reproduced. Therefore, after a disk received on the roulette or tray is completely reproduced, the roulette or tray has to be drawn out to exchange the disks.

The above disk changer requires time for exchanging the disks whereby the recording or reproducing procedures cannot be performed continuously. That is, to exchange a disk received on the roulette after being completely reproduced, the reproducing procedure has to stop. Thereafter, the roulette is drawn out to exchange the disks. A rather long time is required from the point of exchanging the disks to the point of reproducing the disk, such that recorded information cannot be continuously accessed.

SUMMARY OF THE INVENTION

To solve the above problems, it is an object of the present invention to provide a disk changer for receiving two kinds of disks having different sizes, there being a capability of receiving a plurality of at least one of the two different sized disks.

It is another object of the present invention to provide a disk changer for exchanging the disks received on the roulette during the recording or reproducing thereof, thereby improving the continuity of the recording and reproducing procedures.

To achieve the above objects, the present invention comprises: a housing in which an optical pickup having an object lens and a turntable for receiving and rotating a disk are mounted; a roulette for receiving a plurality of first disks on the same plane; a first tray member which is slidably connected to the housing and has a receiving plane for receiving a second disk, which is larger than the first disks, on the upper surface of the first tray member; first transfer means for transferring the first tray member; a second tray member which is slidably connected to the first tray member and on which the roulette is rotatably mounted; second transfer means for transferring the second tray member with respect to the first tray member; and ascending/descending means for raising and lowering the first tray member together with the second tray member. The first and second tray members are lowered by the ascending/descending means so that one of the first disks received in the roulette is placed on the turntable for recording or reproducing, and wherein during the recording and reproducing procedures, only the second tray member is moved outside of the housing by the second transfer means to exchange at least one of the first disks for another like sized disk.

BRIEF DESCRIPTION OF THE DRAWINGS

The above objects and advantages of the present invention will become more apparent by describing in detail a preferred embodiment thereof with reference to the accompanying drawings, in which.

DETAILED DESCRIPTION OF THE PREFERRED EMBODIMENT

Figure 1:
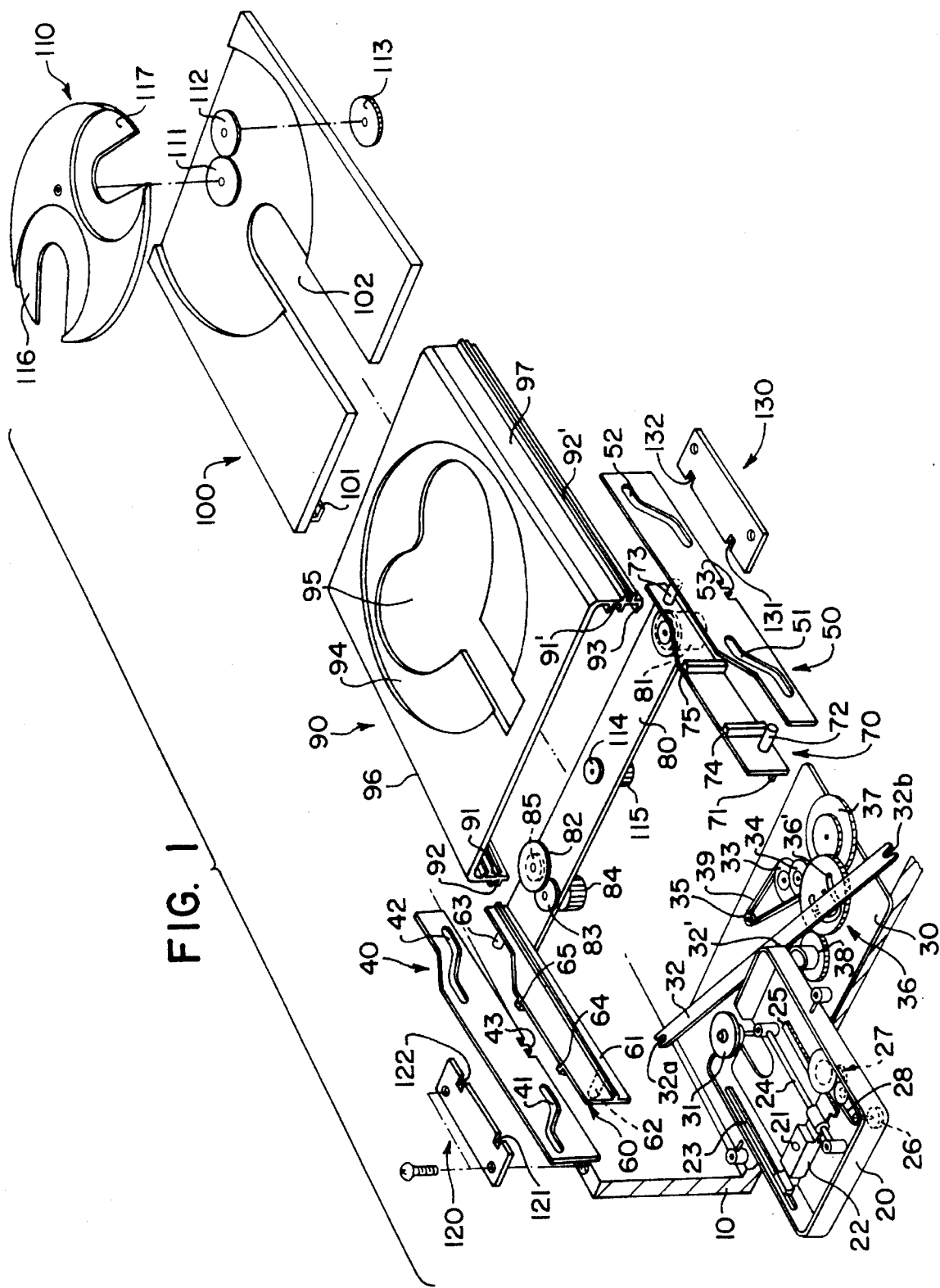
FIG. 1 is a schematic exploded perspective view representing a disk changer according to the present invention.

Referring to FIG. 1 representing a schematic exploded perspective view of the disk changer according to the present invention, a first deck 20 and a second deck 30 are provided in a housing 10. The first deck 20 comprises an optical pickup 22 having an object lens 21, guide rails 23 and 24 for guiding the optical pickup in a direction of the radius of a disk, and a motor 26 for moving the optical pickup 22. Here, a rack 25 is formed at one side of the optical pickup 22. One of a plurality of gears 27 is connected to the motor 26 by a belt 28, and another of the gears 27 is engaged with the rack 25, whereby the optical pickup 22 is moved along the guide rails 23 and 24 by motor 26.

The second deck 30 comprises a spindle motor (not shown) and a turntable 31 which is set on the shaft of the spindle motor.

A first tray member 90 having a receiving plane 94 on which a disk having a larger diameter is received and a groove 95 formed on receiving plane 94 for enabling an optical beam, which passes through object lens 21, and the turntable 31 to pass therethrough is slidably connected to housing 10. Also, the first tray member 90 is adapted to be transferred or moved by a predetermined first transfer means.

The first transfer means comprises guide grooves 92 and 92' on the outside of the left and right walls 96 and 97 of the first tray member 90, and a rack 93 at the lower edge of the right wall 97. The first transfer means also comprises a left chassis 60 and a right chassis 70 which are mounted at the left and right walls of the housing 10 and have guide ribs 61 and 71 fitted in guide grooves 92 and 92' of the first tray member 90, a plate 80 which connects the left chassis 60 and the right chassis 70, and a first transfer gear 81 which is mounted on the plate 80 and engaged with the rack 93 of the first tray member 90, to be rotatably driven by a motor 35.

A belt pulley 33 connected to motor 35 by a belt 39, an intermediate gear 34 engaged with belt pulley 33, a dual cam member 36 engaged with intermediate gear 34 and having a cam groove 36', and an intermediate gear 37 engaged with a lower portion (not shown) of cam member 36 are provided between motor 35 and the first transfer gear 81. The first transfer gear 81 is mounted to be engaged with intermediate gear 37.

The second tray member 100, for receiving a plurality of disks whose diameter is smaller than the disk received on the first tray member 90, is connected to the first tray member 90. An elongated hole 102 in opposition to groove 95 of the first tray member 90 is formed in the second tray member 100. Also, a roulette 110 which has receiving planes 116 and 117 for receiving two disks on the same plane is rotatably supported on the second tray member 100. A gear 111, which is mounted on the rotation center of roulette 110, and a gear 112, which is engaged with gear 111, are mounted on the upper side of the second tray member 100. A gear 113, which is set on the same axis with gear 112, is mounted on the lower side of the second tray member 100. A gear 114 engaged with gear 113 and a motor 115 are mounted on plate 80 so that roulette 110 is revolved by motor 115.

Guide grooves 91 and 91' which can be slidably engaged with the second tray member 100 are formed at the inside of the left and right walls of the first tray member 90. The second tray member 100 can be moved with respect to the first tray member 90 by a predetermined second transfer means.

Here, the second transfer means comprises a rack 101 which is formed at the lower side of the second tray member 100 and a motor 84 which is connected to the rack 101 and mounted on plate 80. A gear 83 is connected to motor 84. A gear 85, having a smaller diameter and engaged with gear 83, and a gear 82, having a larger diameter and mounted on the same axis with gear 85, are mounted on plate 80. The larger diameter gear 82 is meshed with the rack 101 of the second tray member 100. Therefore, the second tray member 100 can be moved at a lower speed than motor 84.

An ascending/descending means is provided for loading the received disk onto the turntable 31 by moving the first tray member 90 and the second tray member 100 upwardly and downwardly.

The ascending/descending means comprises guide sills or ribs 64, 65, 74 and 75 which are formed vertically at the outside of the left and right chassis 60 and 70 which are mounted at the left and right walls of the housing 10 to support the first tray member 90, and guide protrusions 62, 63, 72 and 73 which are formed perpendicularly with respect to the chassis. Guide plates 120 and 130, which are formed with grooves 121, 122, 131 and 132 into which guide sills 64, 65, 74 and 75 can slide, are fixed on the housing 10. Thus, the left chassis 60 and the right chassis 70 can be moved only in the up and down directions along guide plates 120 and 130.

Left and right sliders 40 and 50 which are formed with slanted grooves 41, 42, 51 and 52 to which guide protrusions 62, 63, 72 and 73 are slidably connected are mounted between the left and right walls of the housing 10 and the left and right chassis 60 and 70. Interlocking lever 32, whose ends are respectively connected to the left and right sliders 40 and 50 across the interface between the left and right walls of the housing, is mounted to be pivoted on the second deck 30. Reference numeral 32' indicates an axis of rotation of the center of the interlocking lever 32. Also, connecting protrusions 43 and 53 are formed at the lower edge of the left and right sliders 40 and 50, and connecting grooves 32a and 32b, which are connected to connecting protrusions 43 and 53, are formed at the opposite ends of the interlocking lever 32. A protrusion (not shown) formed at the lower side of interlocking lever 32 is inserted into the cam groove 36' of the cam member 36, whereby interlocking lever 32 can be pivoted in accordance with the rotation of cam member 36.

On the other hand, slanted grooves 51 and 52 which are formed in the right slider 50, and slanted grooves 41 and 42 which are formed in the left slider 40 have oppositely formed slopes. Thus, when interlocking lever 32 is pivoted, the left and right sliders 40 and 50 are moved back and forth, and the left and right chassis 60 and 70 are introduced into slanted grooves 41, 42, 51, 52 to move up and down.

The operation of the disk changer according to the present invention, constituted as above described, is as follows.

Figure 2:
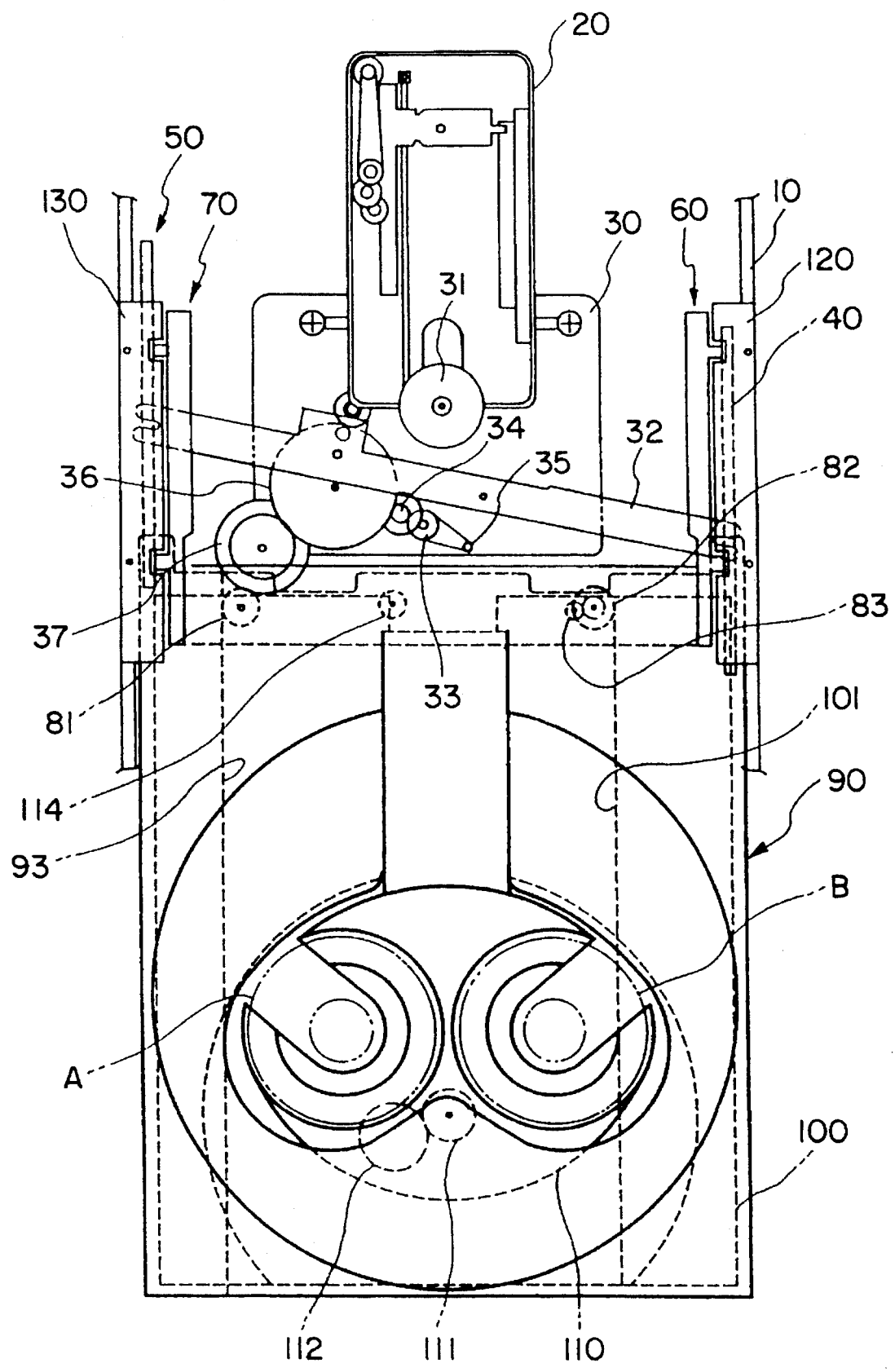
FIG. 2 is a plan view showing the state where first and second tray members are opened.

Referring to FIG. 1 and FIG. 2, belt pulley 33, gear 34, cam member 36 and gear 37 are driven by the motor 35 mounted on the second deck 30, whereby the first transfer gear 81, which is engaged with the rack 93 of the first tray member 90, is rotated counterclockwise. As a result, the first tray member 90 is moved to an opened position (i.e., the first tray member 90 is protruded outside of the housing 10). Simultaneously, the gear 83 and the large-diameter gear 82 engaged with the rack 101 of the second tray member 100 are revolved by the driving of the motor 84 mounted on the plate 80, to thereby open the second tray member 100. As shown in FIG. 2, when the first tray member 90 is completely opened and stopped, the second tray member 100 is further opened such that roulette 110 may be exposed out of the first tray member 90. It is desirable that sensor members (not shown) are installed for stopping the opening operation of the first and second tray members in sequence, when the first tray member 90 and the second tray member 100 are opened enough to exchange the disks. The sensor member for detecting the opening degree of the first tray member 90 can be mounted on plate 80, and the sensor member for detecting the opening degree of the second tray member 100 can be mounted within the first tray member 90. Here, the first tray member 90 and second tray member 100 are located at the upper side of the turntable 31 in the state where these tray members are opened. That is, the guide protrusions 62, 63, 72 and 73 of the left chassis 60 and the right chassis 70 are located at the upper positions of the slanted grooves 41, 42, 51 and 52 of the left slider 40 and the right slider 50, so that the left chassis 60 and right chassis 70 are moved upwardly.

Figure 3:
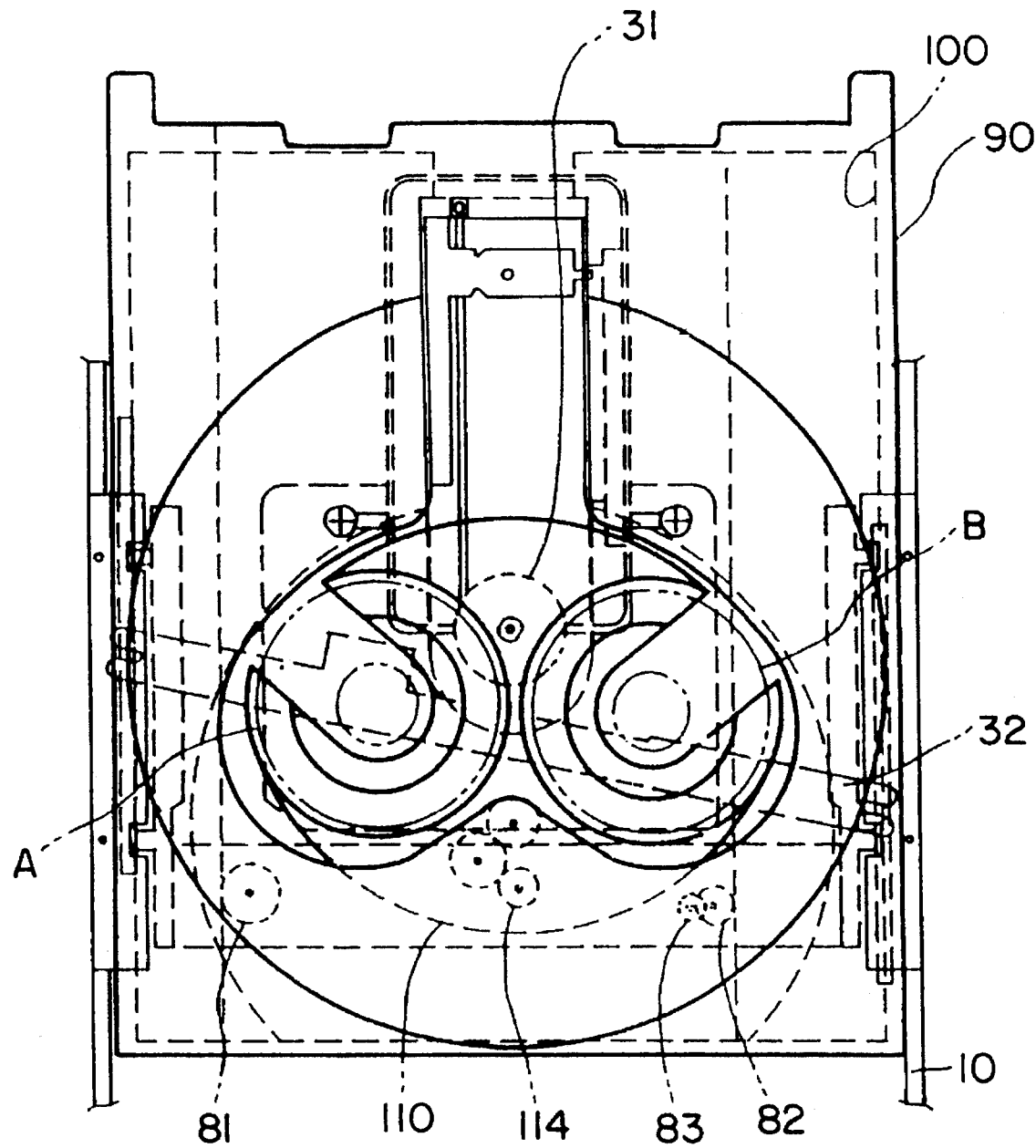
FIG. 3 is a schematic diagram showing the state where first and second tray members are closed while receiving disks.
Figure 4:
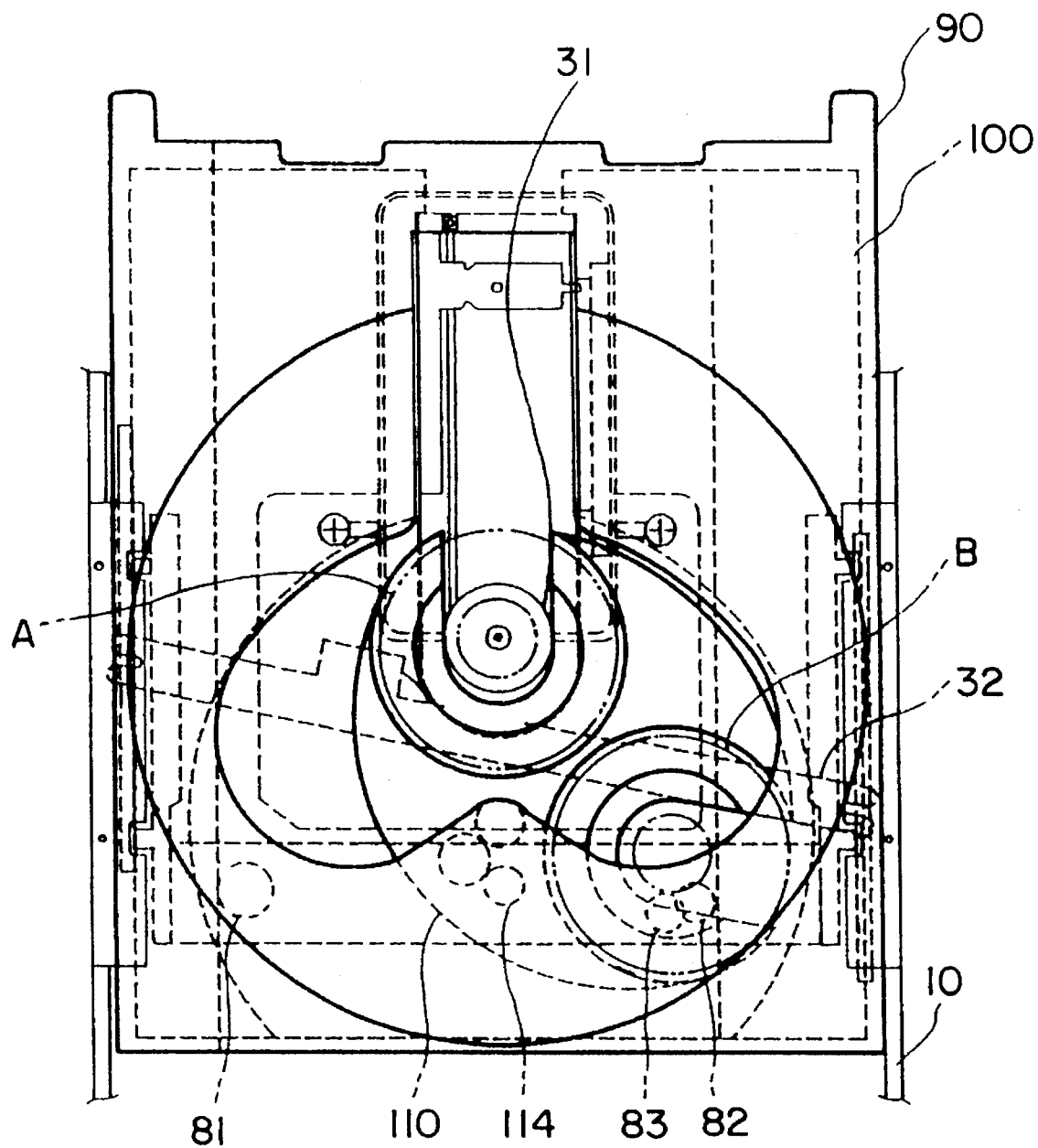
FIG. 4 is a schematic diagram showing the state where a roulette is revolved so that the selected disk is loaded on a turntable.
Figure 5:
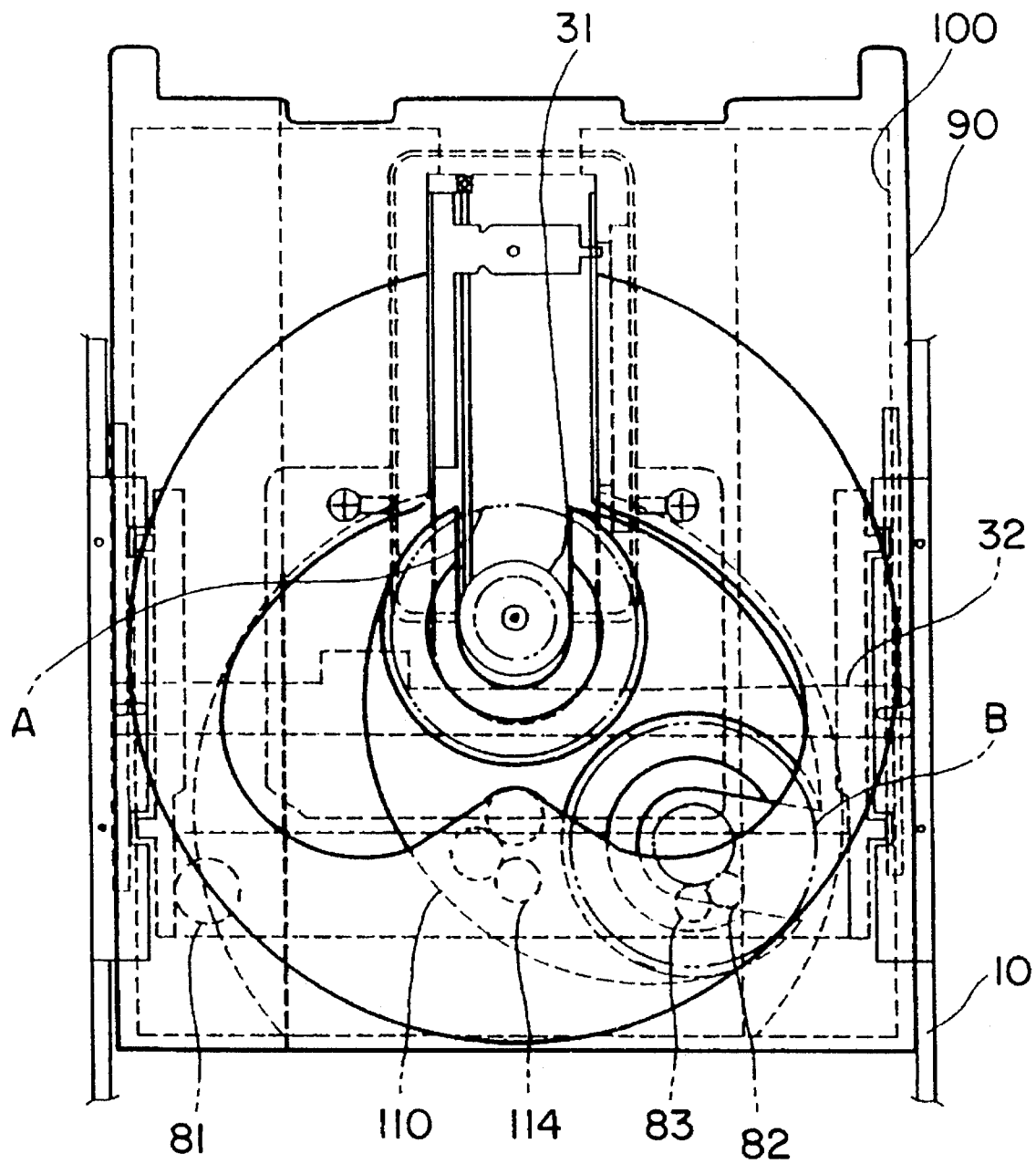
FIG. 5 is a schematic diagram showing the state where the selected disk is being reproduced.

As described above, disks A and B are received on roulette 110 in the state where the first tray member 90 and the second tray member 100 are in an opened position. Thereafter, as shown in FIG. 3, the first tray member 90 and the second tray member 100 are moved to a closed position inside of the housing 10 by the driving of the motors 35 and 84. Here, the cam member 36 is revolved by the driving of motor 35. However, the interlocking lever 32 is not interlocked along the shape of the cam groove. When roulette 110 of the second tray member 100 is located in the upper position of turntable 31, the rotating gear 114 and gears 113, 112 and 111 are interlocked by driving of the motor 115 so that, as shown in FIG. 4, the roulette 110 revolves to locate the selected disk A on the vertical upper position of turntable 31. Then, the cam member 36 continuously revolves thereby pivoting the interlocking lever 32 counterclockwise (refer to FIG. 5). Here, the left slider 40 and the right slider 50 are moved backward, and the left chassis 60 and the right chassis 70 are interlocked with the left slider 40 and the right slider 50 so that the guide protrusions 62, 63, 72 and 73 are located at the lower position of the slanted grooves 41, 42, 51 and 52. Thus, the left chassis 60 and the right chassis 70 are lowered. Accordingly, the first tray member 90 and the second tray member 100 are lowered so that the disk A disposed on roulette 110 is placed on turntable 31. After the disk A is received on the turntable 31, the tray members 90 and 100 are further lowered a little more.

In the state as described above, the turntable 31 is rotated by the driving of the spindle motor, the optical pickup 22 is moved in a direction of the radius of the disk by the driving of the motor 26, and the optical beam is irradiated through the object lens 21, thereby performing a reproducing operation.

Figure 6:
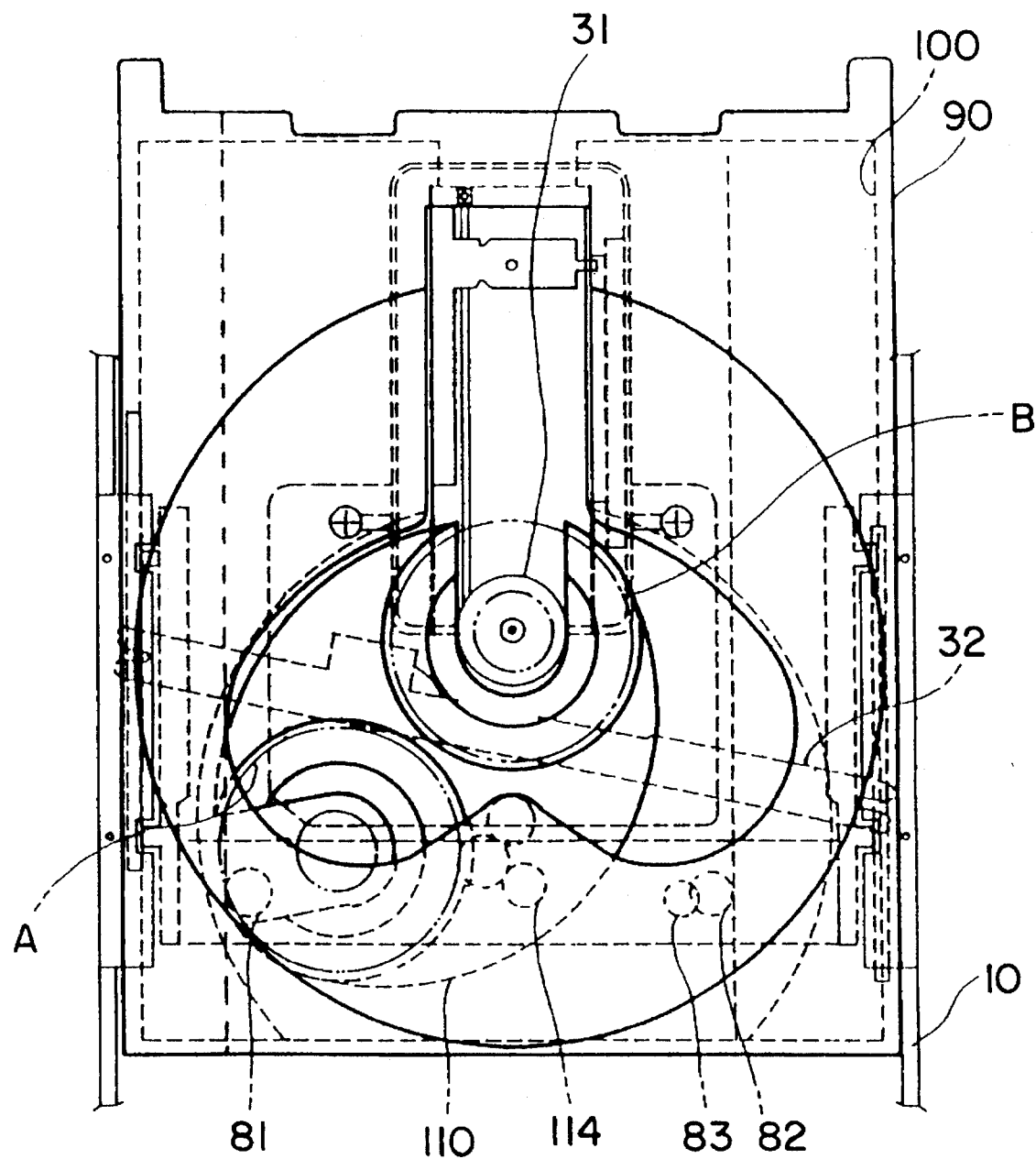
FIG. 6 is a schematic diagram showing an operation for exchanging the disks on the roulette.
Figure 7:
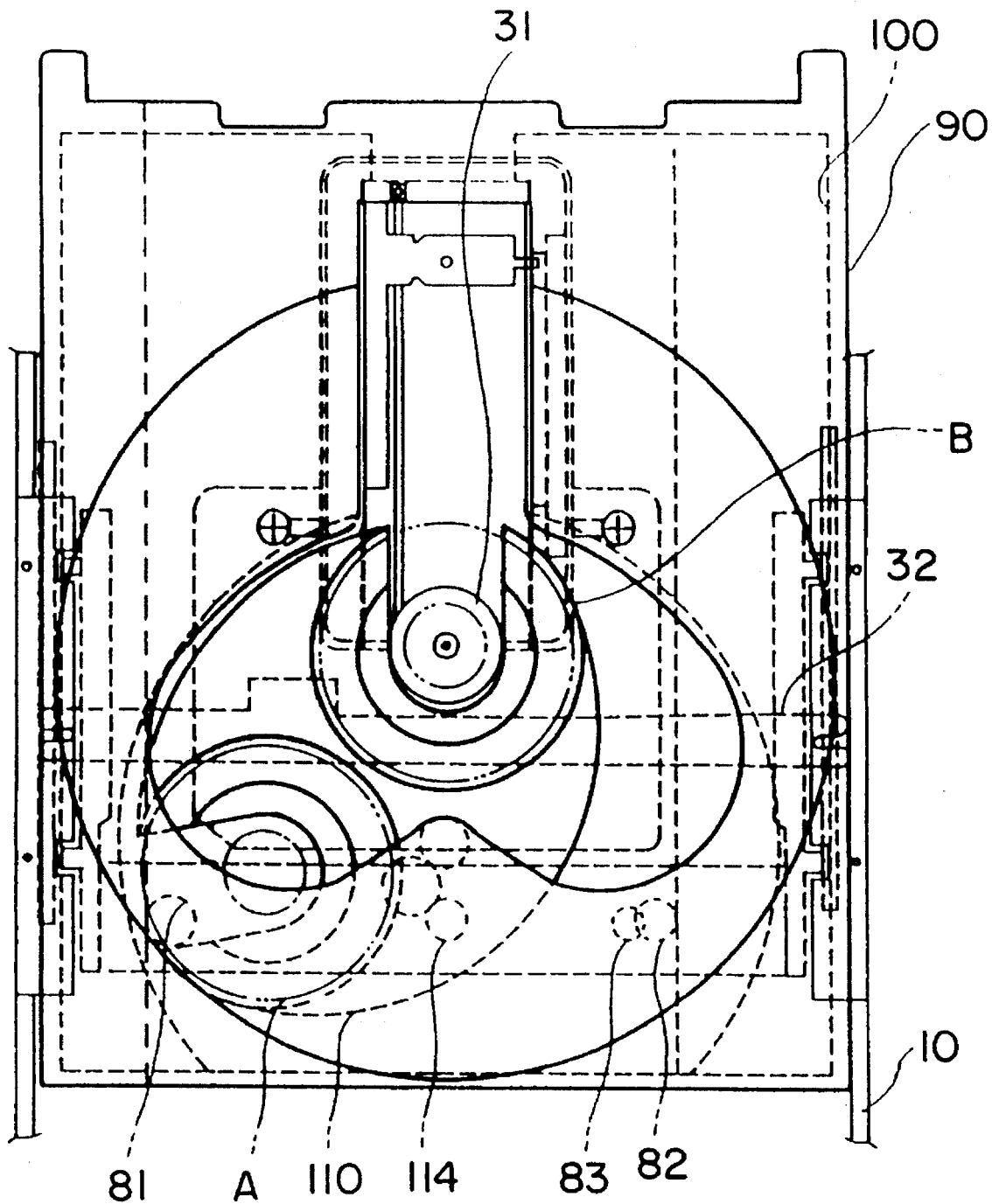
FIG. 7 is a schematic diagram showing an operation for reproducing the exchanged disk of FIG. 6.

After the selected disk A is completely reproduced, the interlocking lever 32 is pivoted clockwise by reversely driving the motor 35. Simultaneously, the left slider 40 and the right slider 50 are moved back and forth, so that the left chassis 60 and the right chassis 70 are moved upwardly. Here, the disk disposed on the turntable 31 is received on roulette 110. Simultaneously, as shown in FIG. 6, the roulette 110 is revolved to place another disk B in the upper position of turntable 31 by the driving of the motor 115. Thereafter, as shown in FIG. 7, the interlocking lever 32 is revolved counterclockwise by the driving of the motor 35, o thereby lowering the first tray member 90 and the second tray member 100. As a result, the exchanged disk B is loaded onto turntable 31. As the interlocking lever 32 is continuously pivoted, the first tray member 90 and the second tray member 100 are further lowered a little more so as to be separated from turntable 31. Subsequently, as described above, the exchanged disk B is reproduced by driving the spindle motor and the optical pickup 22.

Figure 8:
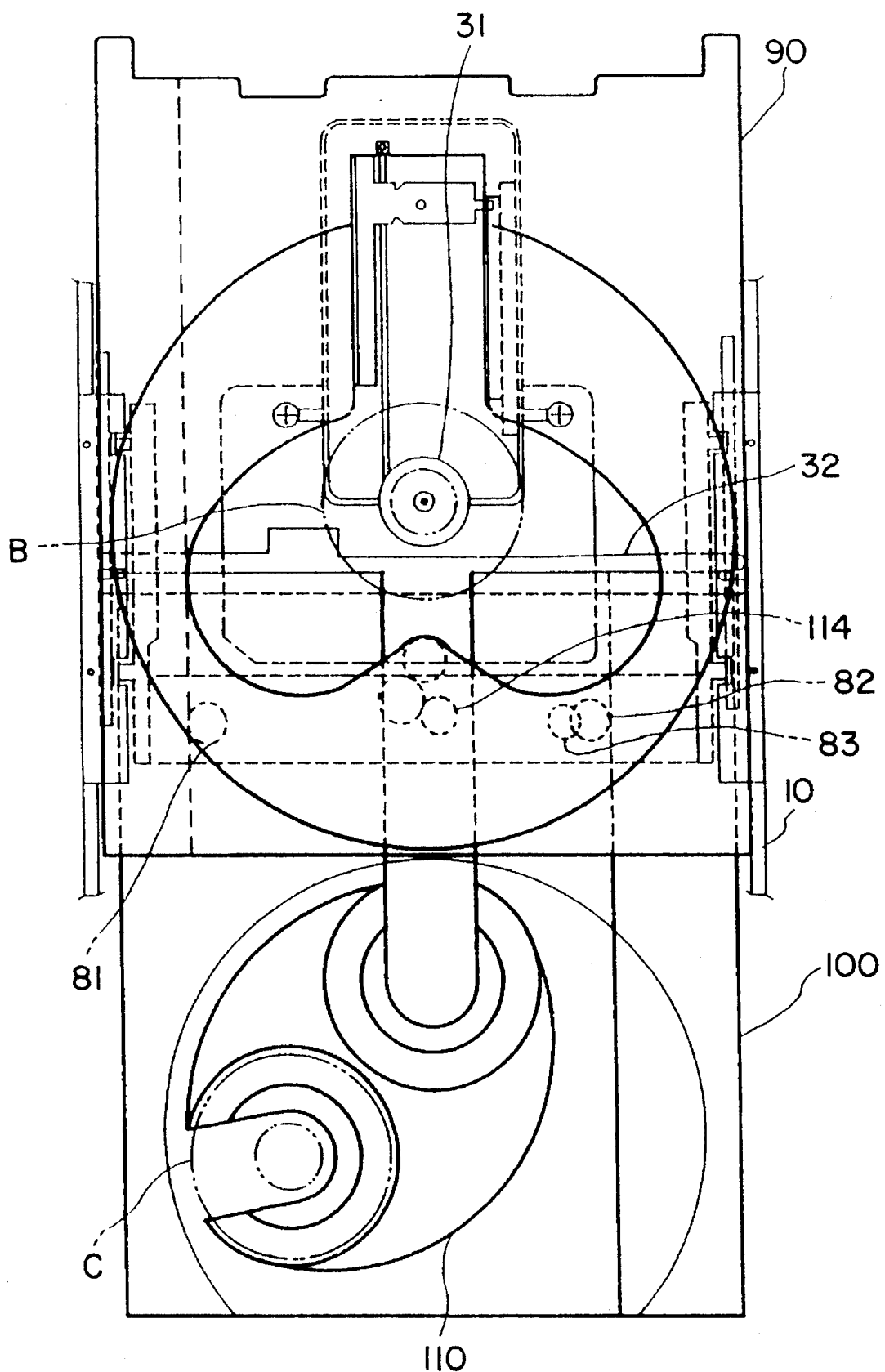
FIG. 8 is a schematic diagram showing the state where the second tray member is opened to exchange a completely reproduced disk.

On the other hand, when the motor 115 is driven to exchange the disk which has been completely reproduced with a new disk during reproducing, as shown in FIG. 8, the rack 101 is in mesh with the second transfer gear 82, thereby the second tray member 100 to an opened position. Here, the first tray member 90 is stopped, and the second tray member 100 is introduced into guide grooves 91 and 91' of the first tray member 90 to be opened. In this state, reproduced disk A is exchanged for a new disk C and then the second tray member 100 is closed by reversely driving the motor 115.

Figure 9:
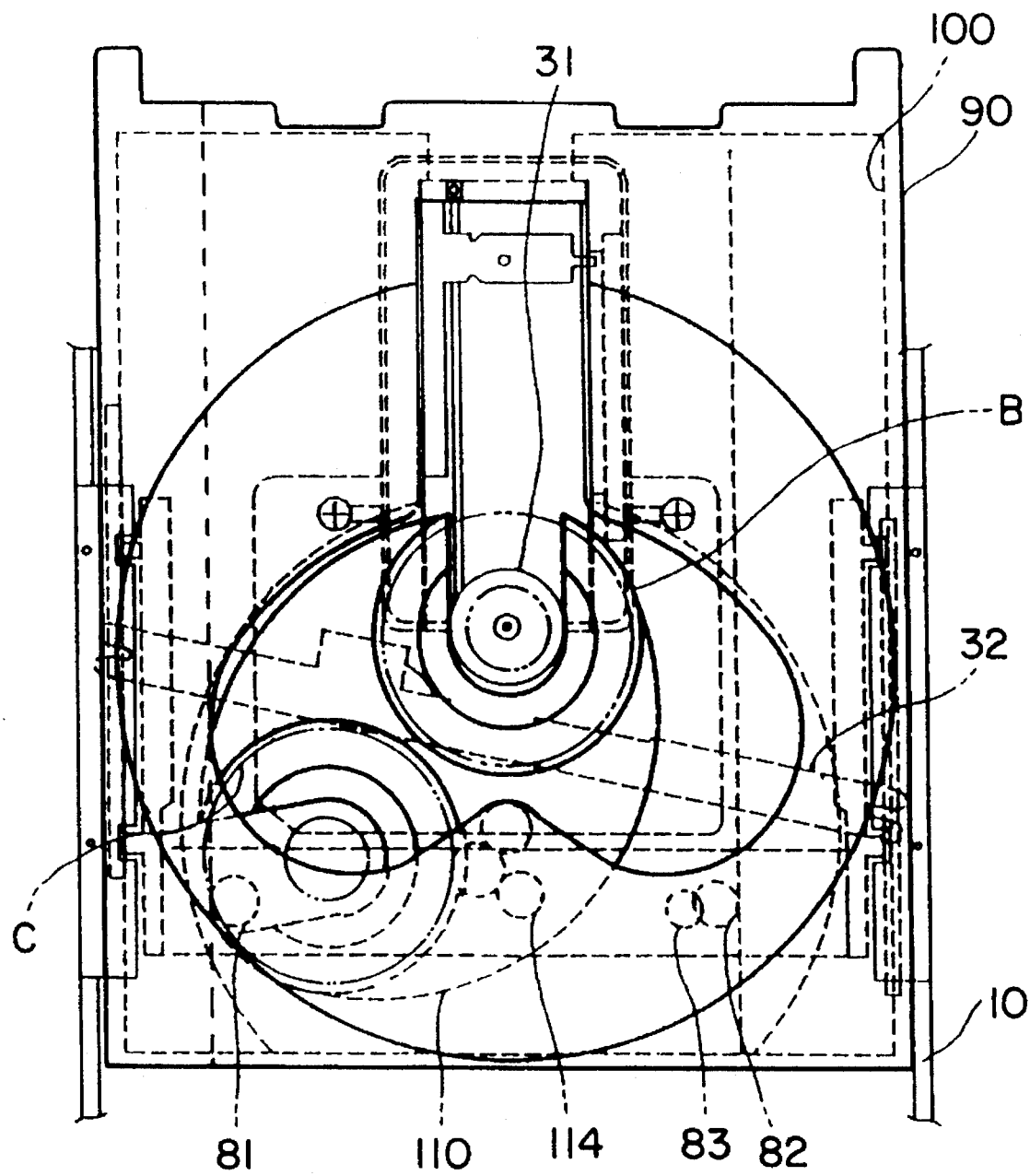
FIG. 9 is a schematic diagram showing an operation for exchanging the completely reproduced disk in FIG. 7.

Thereafter, when the disk B is completely reproduced, the interlocking lever 32 is pivoted counterclockwise by the driving of motor 35, as shown in FIG. 9, thereby moving the left slider 40 and the right slider 50 back and forth. Then, the left chassis 60 and the right chassis 70 are moved upwardly according to the movement of the sliders, thereby raising the first tray member 90 and the second tray member 100. Here, the disk B placed on the turntable 31 is received on receiving plane 116 of the roulette 110.

Figure 10:
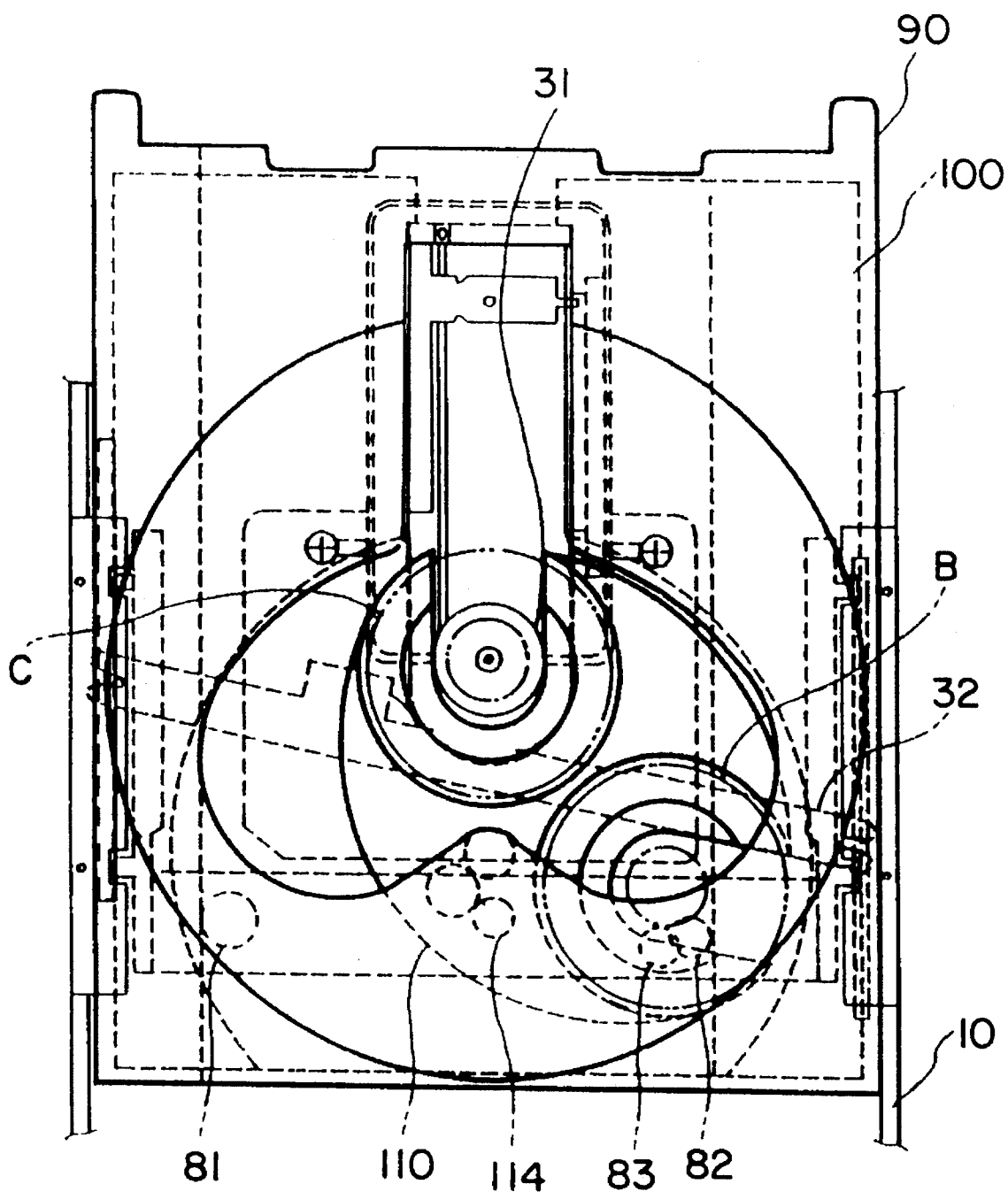
FIG. 10 is a schematic diagram showing the state where the roulette is revolved to reproduce the exchanged disk in FIG. 8.
Figure 11:
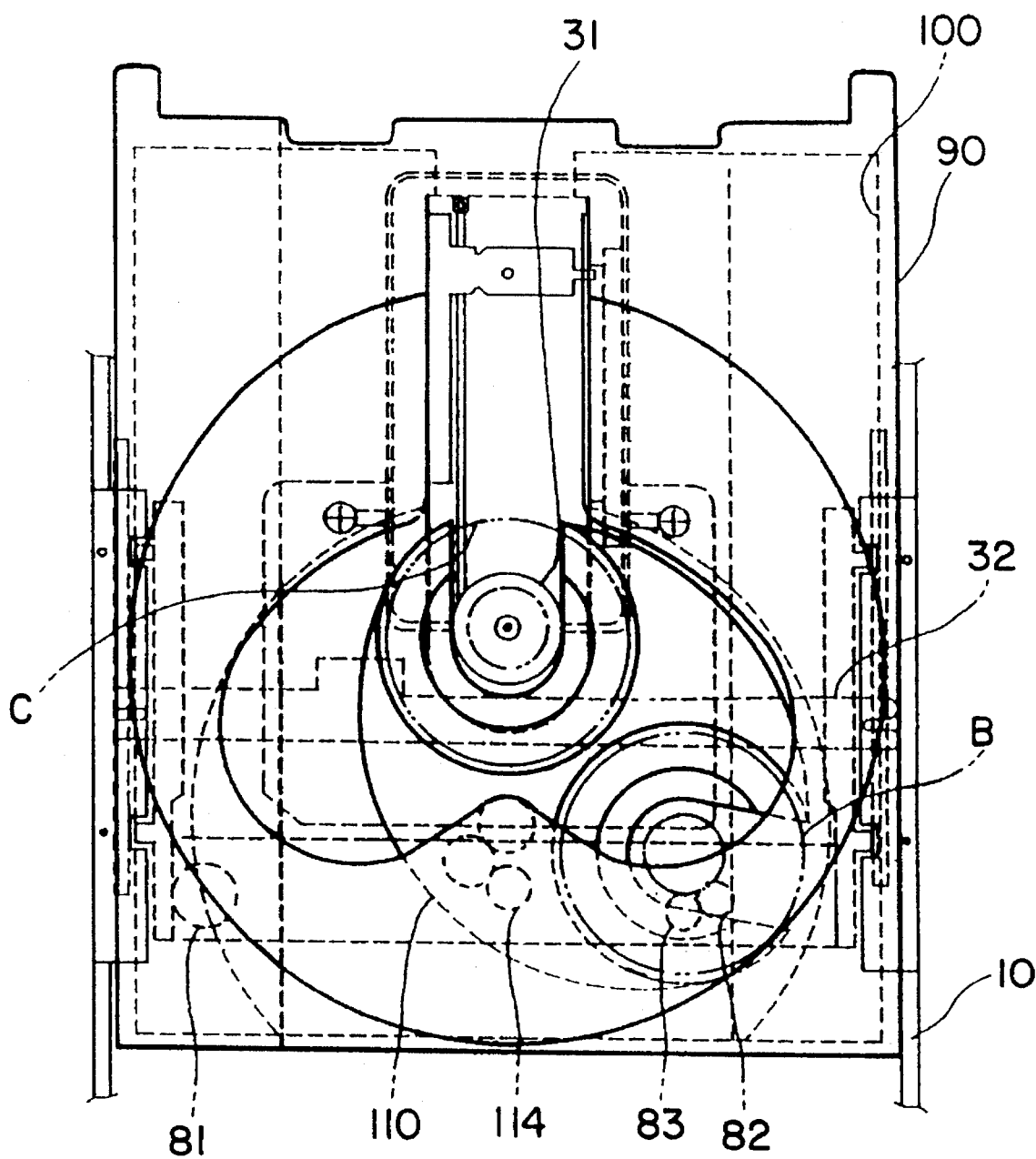
FIG. 11 is a schematic diagram showing the state where the disk exchanged in FIG. 10 is being reproduced.

In the state as described above, the motor 115 is driven to revolve the roulette 110 so that the exchanged disk C is placed on the turntable 31 for reproduction thereof, as shown in FIG. 10. Then, the interlocking lever 32 is pivoted counterclockwise by the driving of the motor 35, so that the first tray member 90 and the second tray member 100 are lowered to place the disk C on the turntable 31 and stopped in a further lowered position. Thereafter, as described above, the reproducing procedure is performed by driving the spindle motor and the optical pickup 22 (refer to FIG. 11). When the disk, which has been completely reproduced, is exchanged for another disk during a reproducing procedure, the operations are as described above. Therefore, the detailed description about the operation will be omitted. Also, although the foregoing embodiment has been described with reference to a reproducing mode, it will be understood by those skilled in the art that the apparatus of the present invention is equally adaptable to the recording modes.

Figure 12:
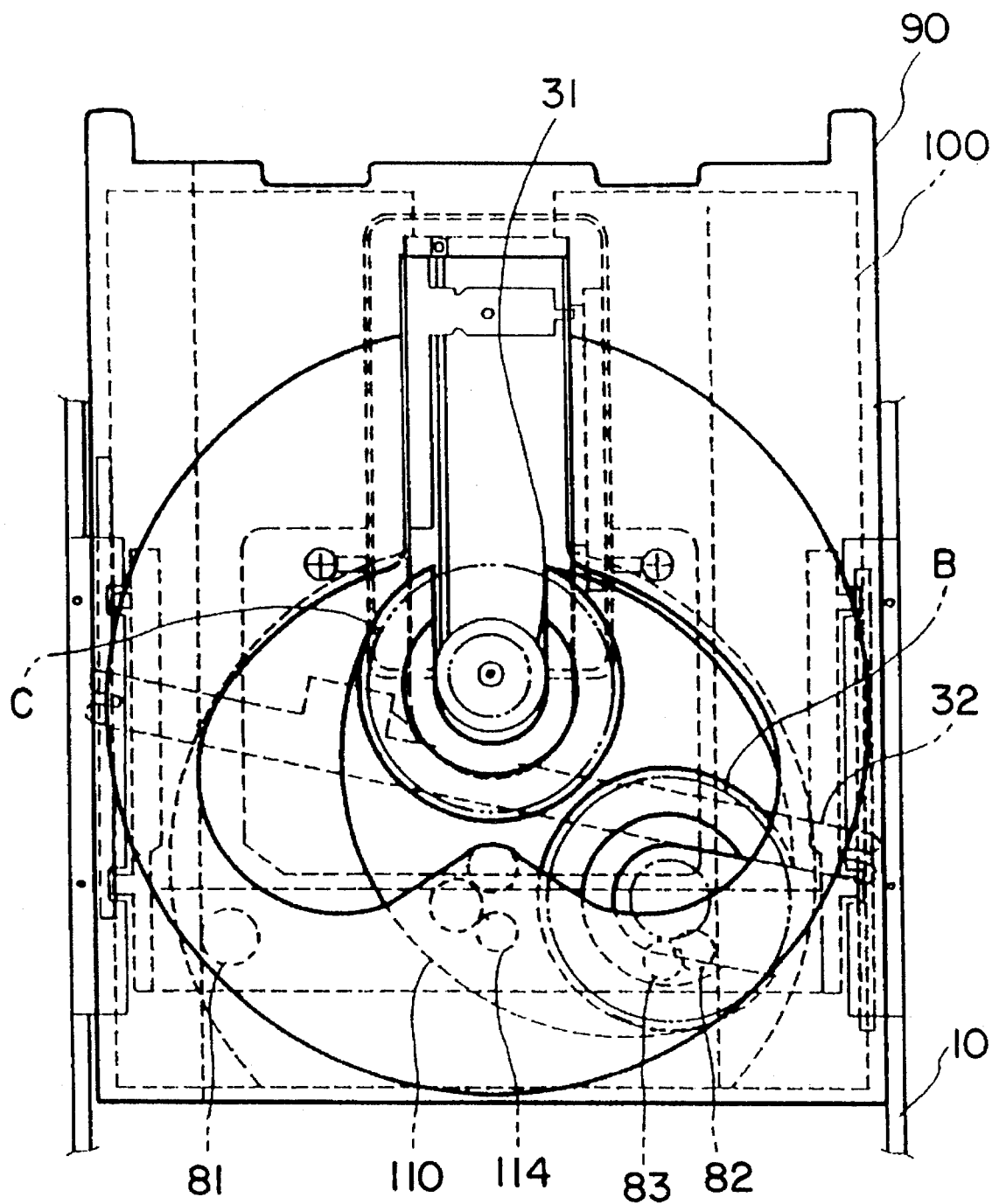
FIG. 12 is a schematic diagram showing an operation for ejecting the completely reproduced disk in FIG. 11.
Figure 13:
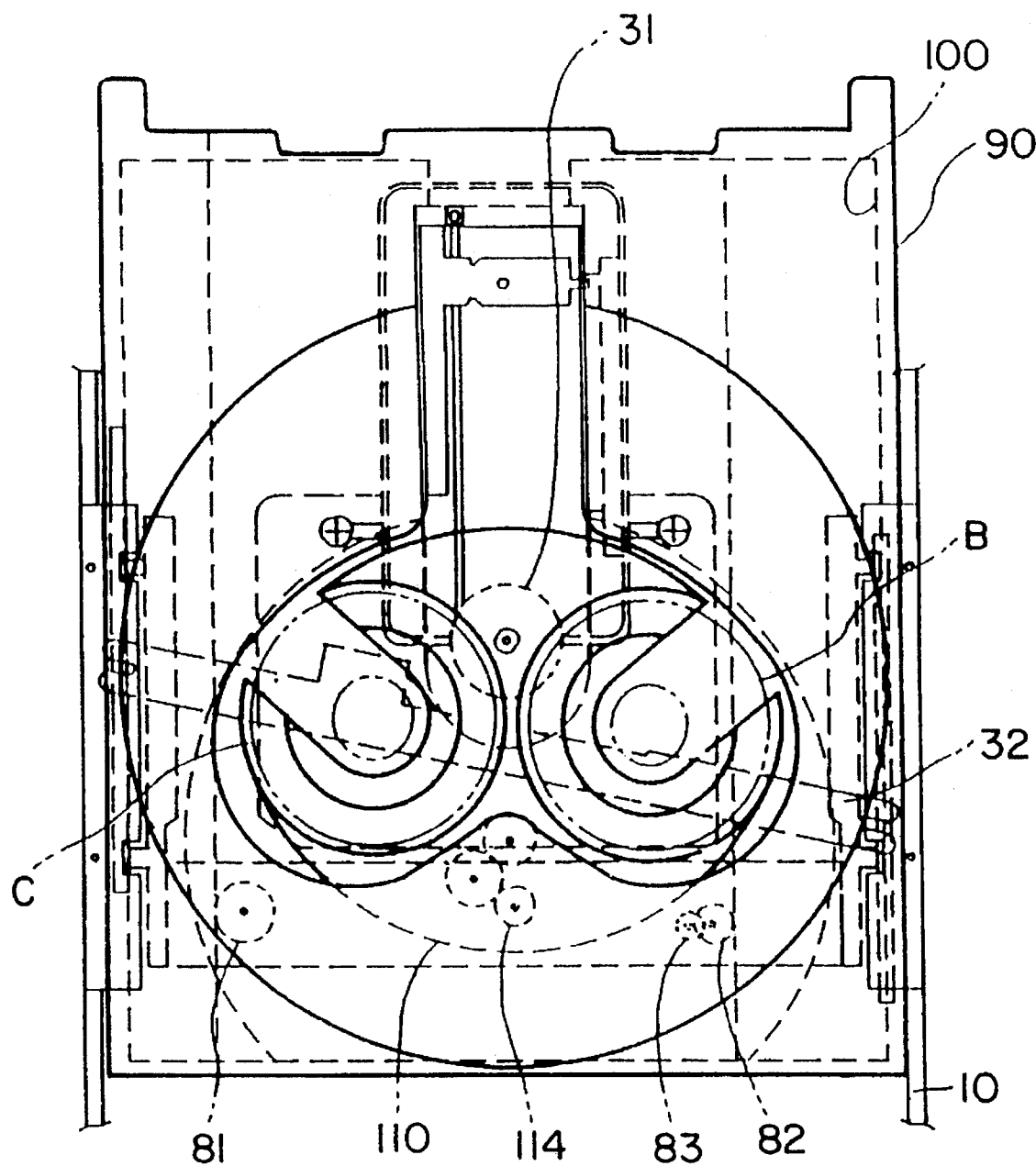
FIG. 13 is a schematic diagram showing the state where the roulette from which the disk has been ejected in FIG. 12 is rotated.

When the disk changer is turned off, as shown in FIG. 12, the spindle motor is stopped and the interlocking lever 32 is pivoted clockwise so as to raise the first tray member 90 and the second tray member 100 and thereby place the disk, which is loaded on turntable 31, onto the roulette 110. Subsequently, the roulette 110 is stopped in the state shown in FIG. 13, by the driving of the motor 115, and the power is turned off.

As described above, the disk changer according to the present invention can receive two kinds of disks having different sizes: one of the larger size and a plurality of the smaller size. When the disk selected from the received disks is reproduced (or recorded), the disk which has been completely reproduced (or recorded) can be exchanged for a new disk, by opening only the second tray member. Thus, the reproducing and recording procedures can be continuously performed without interruption for exchanging disks.

It is contemplated that numerous modifications may be made to the disk changer of the present invention without departing from the spirit and scope of the invention as defined in the following claims.

What is claimed is:

1. A disk changer comprising:

a housing in which an optical pickup having an object lens and a turntable for receiving and rotating a disk are mounted;

a roulette for receiving a plurality of first disks;

a first tray member which is slidably connected to the housing and has a receiving plane for receiving a second disk, which is larger than the first disks, on an upper surface of the first tray member;

first transfer means for transferring the first tray member;

a second tray member which is slidably connected to the first tray member and on which the roulette is rotatably mounted;

second transfer means for transferring the second tray member with respect to the first tray member; and ascending/descending means for raising and lowering the first tray member together with the second tray member, wherein said first and second tray members are lowered by said ascending/descending means so that one of the first disks received in the roulette is placed on the turntable for one of recording and reproducing, and wherein during said one of recording and reproducing, the second tray member is operative to move outside of the housing by the second transfer means, independently of the first tray member, to exchange at least one of the first disks for another disk, while the first tray member remains within the housing.

2. The disk changer as claimed in claim 1, wherein said housing includes left and right walls and said first tray member includes left and right walls, and wherein said first transfer means comprises first guide grooves formed on an outer portion of the left and right walls of the first tray member, a first rack formed at one edge of at least one of the left and right walls of the first tray member, left and right chassis which are mounted at the left and right walls of said housing and in which a guide rib fitted in said first guide grooves of the first tray member is formed, and a first transfer gear which is mounted on a moving path of said first rack to be in mesh with said first rack and rotatably driven by a first motor.

3. The disk changer as claimed in claim 1, wherein said first tray member includes left and right walls, and wherein said second transfer means comprises second guide grooves, for guiding said second tray member, formed at an inner portion of the left and right walls of said first tray member, a second rack formed at a bottom surface of said second tray member, and a second transfer gear which is mounted on a moving path of the second tray member to be in mesh with said second rack and rotatably driven by a second motor.

4. The disk changer as claimed in claim 1, wherein the housing includes left and right walls and wherein said ascending/descending means comprises:

left and right chassis which are mounted at the left and right walls of the housing, respectively, to slidably support the first tray member, and each chassis having a guide protrusion formed on an outside thereof;

left and right sliders formed with slanted grooves each of which is connected to a corresponding said guide protrusion;

an interlocking lever having opposite ends which are respectively connected to the left and right sliders and being pivotally mounted to move the sliders back and forth; and a cam member which is rotatably driven by a first motor to pivot the interlocking lever, wherein the left and right chassis are introduced into the slanted grooves to move said first tray member up and down when the left and right sliders are moved back and forth.

5. A disk changer comprising:

a housing including left and right walls and in which an optical pickup having an object lens and a turntable for receiving and rotating a disk are mounted;

a roulette for receiving a plurality of first disks;

a first tray member including left and right walls and which is slidably connected to the housing and has a receiving plane for receiving a second disk, which is larger than the first disks, on an upper surface of the first tray member;

a first transfer mechanism, for transferring the first tray member, including first guide grooves formed in an outer portion of the left and right walls of the first tray member, a first rack formed at one edge of at least one of the left and right walls of the first tray member, left and right chassis which are mounted at the left and right walls of said housing and in which a guide rib fitted in said first guide grooves of the first tray member is formed, and a first transfer gear which is mounted on a moving path of said first rack to be in mesh with said first rack and rotatably driven by a first motor;

a second tray member which is slidably connected to the first tray member and on which the roulette is rotatably mounted;

a second transfer mechanism, for transferring the second tray member with respect to the first tray member, comprising second guide grooves, for guiding said second tray member, formed at an inner portion of the left and right walls of said first tray member, a second rack formed at a bottom surface of said second tray member, and a second transfer gear which is mounted on a moving path of the second tray member to be in mesh with said second rack and rotatably driven by a second motor; and an ascending/descending mechanism for raising and lowering the first tray member together with the second tray member, wherein said first and second tray members are lowered by said ascending/descending mechanism so that one of the first disks received in the roulette is placed on the turntable for one of recording and reproducing, and wherein during said one of recording and reproducing, the second tray member is operative to move outside of the housing by the second transfer mechanism, independently of the first tray member, to exchange at least one of the first disks for another disk, while the first tray member remains within the housing.

6. The disk changer as claimed in claim 5, wherein said ascending/descending mechanism comprises:

left and right chassis which are mounted at the left and right walls of the housing, respectively, to slidably support the first tray member, and each chassis having a guide protrusion formed on an outside thereof;

left and right sliders formed with slanted grooves each of which is connected to a corresponding said guide protrusion;

an interlocking lever having opposite ends which are respectively connected to the left and right sliders and being pivotally mounted to move the sliders back and forth; and a cam member which is rotatably driven by said first motor to pivot the interlocking lever, wherein the left and right chassis are introduced into the slanted grooves to move said first tray member up and down when the left and right sliders are moved back and forth.

* * * * *